(No Model.)

S. H. RAYMOND.
COMBINED FASTENING AND NUT LOCK FOR VEHICLE TOPS.

No. 266,199. Patented Oct. 17, 1882.

Attest:
Geo. T. Smallwood Jr.
D. H. Hopkins.

Inventor:
Silas H. Raymond.
By Knight Bros.
attys

United States Patent Office.

SILAS H. RAYMOND, OF SOUTH BEND, INDIANA.

COMBINED FASTENING AND NUT-LOCK FOR VEHICLE-TOPS.

SPECIFICATION forming part of Letters Patent No. 266,199, dated October 17, 1882.

Application filed July 22, 1882. (No model.)

*To all whom it may concern:*

Be it known that I, SILAS H. RAYMOND, a citizen of the United States, residing at South Bend, in the county of St. Joseph and State of Indiana, have invented an Improved Combined Fastening and Nut-Lock for Vehicle-Tops, of which the following is a specification.

It is evident and well known that the usual practice of employing ornamental caps of gold, silver, brass, or other material on the nuts which secure the frame-irons and props of carriages on the studs upon which they turn precludes the possibility of riveting such nuts so as to effectually secure them against loosening and coming off. Hence it is the common practice to screw such nuts home as tightly as possible by means of a wrench; but when this is done, even to such an extent as to apply an undesirable amount of friction to the joints, the nuts are still liable to work loose and fall off if not constantly watched and frequently tightened. To obviate these difficulties I have devised a combined fastening and nut-lock which, while permitting the ready application and removal of the nut, secures it against working loose and falling off.

To this end my invention consists in the combination of an elastic washer surrounding the screw-stud attached to the shifting rail or top frame and forming a spring-backing for a metal washer, the face of which is formed with a series of radial projections or ribs, and a cap-nut, the face of which is formed with a series of radial depressions corresponding to the ribs on the face of the metal washer, as hereinafter more fully described.

In order that my invention may be fully understood, I will proceed to describe it with reference to the accompanying drawings, forming part of this specification, in which—

Figure 1:
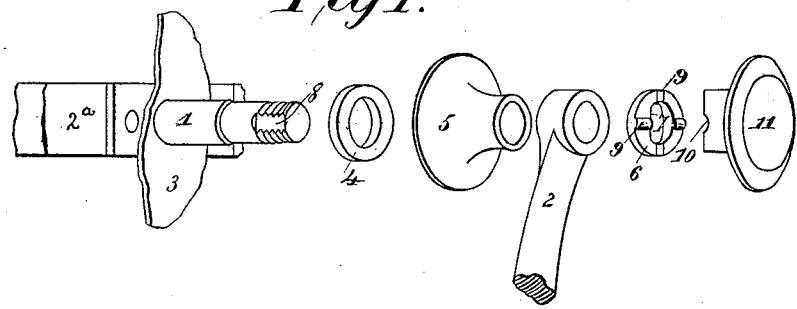
Figure 2:
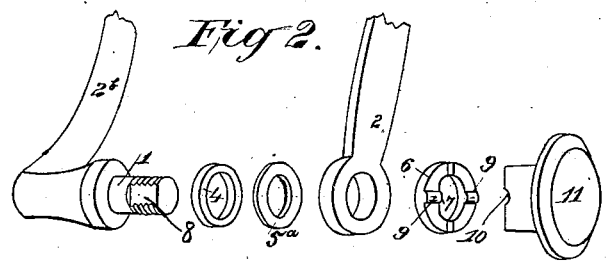
Figure 3:
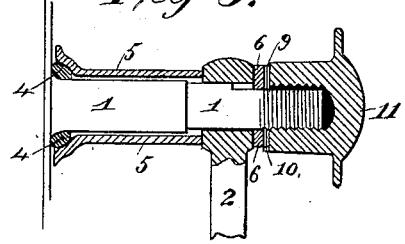
Figure 4:
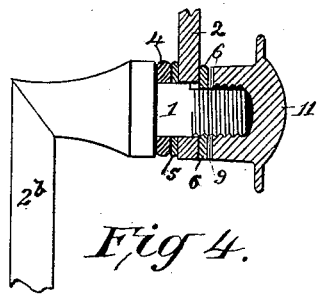

Figure 1 is a perspective view of a portion of the top frame of a vehicle to which the screw-stud is attached, and the fastening and locking devices, the latter being separated. Fig. 2 is a similar view of a portion of the shifting rail or goose-neck to which the screw-stud is attached, and the fastening and locking devices, the latter being separated. Fig. 3 is a longitudinal vertical section of the parts shown in Fig. 1, the several parts being united as in use. Fig. 4 is a longitudinal vertical section of the parts shown in Fig. 2, the several parts being united as in use.

Referring to Fig. 1, 1 represents the screw-stud, the inner end of which is cast with a flat plate having a suitable number of holes formed through it, by which a series of screws or nails or other similar devices are passed through said plate and into the horizontal bar $2^a$ of the top frame. Outside of the cover (a fragment of which is shown at 3) is placed an elastic ring or washer, 4, of rubber or any suitable elastic material, said washer surrounding the screw-stud 1. A thimble-washer, 5, is placed next to the elastic washer 4, said thimble-washer also surrounding the screw-stud 1 and serving to hold the prop-iron 2 at the required distance from the top frame. This top iron 2 is formed with an eye in its upper end, through which the screw-stud 1 passes. On the outside of the prop 2 is a washer, 6, formed with a flat portion, 7, in its eye or aperture, to fit a corresponding depression, 8, in the outer end of the screw-stud 1, in order to prevent the rotation of the said washer on the stud. This washer is provided on its outer face with a series of radial or ratchet teeth, 9, engaging with corresponding depressions, 10, in the face of the cap-nut 11. This nut is formed with the customary square or polyangular periphery, and with any desired ornamental cap or exterior face.

In the illustration of my invention shown in Figs. 2 and 4 the screw-stud 1 is rigidly formed upon or secured to the end of the shifting rail or goose-neck $2^b$, which latter is attached in customary manner to the seat or other part of the vehicle. The elastic washer 4 is placed upon the screw-stud next to the shifting rail. A plain metal washer, $5^a$, is placed upon the screw-stud next to the elastic washer to prevent wear. The perforated lower end of the prop 2 is placed upon the screw-stud next to the metal washer. The ratchet-faced washer 6 is placed on the screw-stud next to the prop, the straight edge 7 of its eye and the depression 8 of the screw-stud preventing said washer from turning; and the cap-nut 11 is lastly screwed onto the end of the screw-stud, the depressions 10 on its face receiving the ribs or projections of the ratchet-washer, so that when said cap-nut is screwed home the several parts above described are securely locked.

In using this invention in either of the two embodiments herein shown the parts are crowded closely together and the cap-nut 11 securely locked through the action of the elastic washer 4, ratchet-washer 9, and cap-nut 11. As the cap-nut 11 is screwed farther and farther onto the screw-spindle the ratchet-washer 6 and the parts 2 and 5 (or 5ª) are permitted to fall back as the ribs 9 of the ratchet-washer pass over the raised portions of the face of nut 11, between the depressions 10 thereof, and said parts are thrown forward as the projections 9 enter the depressions 10. Both of these movements are due to the elasticity of the washer 4, and it is the means by which the locking of the nut 11 is accomplished, its pressure keeping the projections 9 firmly within the depressions 10 when the nut 11 is fully forced home. It will further be seen that the prop 2 and the nut 11 are the only parts which turn or play upon the screw-stud, the other parts, with the exception, perhaps, of the washer 5ª or the thimble-washer 5, remaining at rest during the turning of the nut 11.

It will be observed that in both forms of my invention herein shown a metal washer is interposed between the end of the top iron and the face of the elastic washer. The advantage of this arrangement is that the friction due to the turning of the top iron as the cover is raised and lowered is borne by a metallic surface, which is adapted to receive it, whereas if such friction were brought upon the elastic washer it would be speedily destroyed owing to its delicacy of material or structure.

Having thus described my invention, what I claim as new therein, and desire to secure by Letters Patent, is—

The combined nut-lock and fastening for rotatively uniting parts of vehicles, consisting of the screw-stud 1, attached to one of the parts and having a flat portion or depression, 8, an elastic washer, 4, placed thereon and resting against a suitable bearing-surface, a metal washer resting on the elastic washer, the other part to be fastened, a metal washer, 6, having a flat portion or straight edge, 7, in its eye and radial projections 9 on its face, and nut 11, having radial recesses 10, as and for the purposes set forth.

SILAS H. RAYMOND.

Witnesses:
E. F. WHEELER,
JOHN P. SCHOUTEN.